United States Patent
Wang et al.

[11] Patent Number: 5,848,186
[45] Date of Patent: *Dec. 8, 1998

[54] FEATURE EXTRACTION SYSTEM FOR IDENTIFYING TEXT WITHIN A TABLE IMAGE

[75] Inventors: Shin-Ywan Wang, Tustin, Calif.; Toshiaki Yagasaki, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 514,252

[22] Filed: Aug. 11, 1995

[51] Int. Cl.⁶ ......................................................... G06K 9/36
[52] U.S. Cl. ........................................... 382/176; 382/180
[58] Field of Search ..................................... 382/190, 175, 382/176, 180, 173; 358/453, 462, 467

[56] References Cited

U.S. PATENT DOCUMENTS

| | | | |
|---|---|---|---|
| 4,905,185 | 2/1990 | Sakai | 395/802 |
| 5,048,107 | 9/1991 | Tachikawa | 382/173 |
| 5,075,895 | 12/1991 | Bessho | 382/317 |
| 5,111,514 | 5/1992 | Ohta | 382/177 |
| 5,295,000 | 3/1994 | Nonoshita | 358/444 |
| 5,588,072 | 12/1996 | Wang | 382/176 |

FOREIGN PATENT DOCUMENTS 0287027  10/1988  European Pat. Off. .
3-172984  7/1991  Japan .

Primary Examiner—Jon Chang
Attorney, Agent, or Firm—Fitzpatrick, Cella, Harper & Scinto

[57] ABSTRACT

In a feature extraction system for analyzing image data of an input document image, a feature extraction method identifies image data as a table image and identifies text image within the table image by performing the steps of inputting image data of a document page, performing block selection processing on the document page, the block selection process identifies and separates the image data into blocks having the same image type, identifying table image data based on the separated blocks of image data, identifying text blocks within the table image data, horizontally sorting all text blocks located in the table image data based on horizontal position information, vertically sorting all text blocks located in the table image data based on vertical position information, separating text blocks into rows and columns based on a result of the vertical and the horizontal sorting steps, assigning column and row address coordinates to each text block in the table image data based on the separating step, and storing the assigned address of each text block.

19 Claims, 14 Drawing Sheets

FIG. 1

FEATURE EXTRACTION SYSTEM FOR IDENTIFYING TEXT WITHIN A TABLE IMAGE

BACKGROUND OF THE INVENTION

1. Field of the Invention

The present invention relates to a feature extraction system for analyzing a document page in order to distinguish between different types of image data in the document page utilizing block selection processing and for extracting image data within the document page for further processing based on the analyzed image data, and, more particularly, the present invention relates to a feature extraction system which, upon identifying image data as a table, defines columns and rows in the image data identified as the table, assigns a row and column address coordinates to text blocks in the table, sub-divides certain text blocks into smaller text blocks, if necessary, and stores the coordinates in a hierarchical tree structure for post-processing extraction of the text data from the table using the column and row address coordinates.

2. Description of the Related Art

In conventional feature extraction systems, different types of image data within a document are first identified in accordance with image type and then grouped together based on type. Grouped image data is subsequently extracted for further processing. Specifically, the feature extraction system executes a block selection routine so as to identify image data within a document, such as text data, table data, or graph data. Identified image data is grouped together based on image type, preferably, in a block rectangular format. Once the image data is grouped together in the block format, the image data within the block is extracted for further processing based on its image type.

Recently developed block selection techniques, such as the techniques described in U.S. patent application Ser. No. 07/873,012 filed Apr. 24, 1992, now U.S. Pat. No. 5,680,479, and U.S. patent application Ser. No. 08/388,781, filed Feb. 15, 1995, now abandoned, are used in feature extraction systems to provide automatic analysis of images within a document page in order to distinguish between different types of image data within the document page. The result of such a block selection technique is used to determine the type of subsequent processing to be performed on the image, such as optical character recognition (OCR), data compression, data routing, data extraction, etc. For example, image data which is designated as text data will be subjected to OCR processing, whereas image data which is designated as picture data would not be designated to OCR processing. As a result, different types of image data can be input and automatically processed without an operator's intervention.

An example of how a block selection technique operates, such as the ones referenced above, will be discussed below with respect to FIGS. 1–3.

Figure 1:
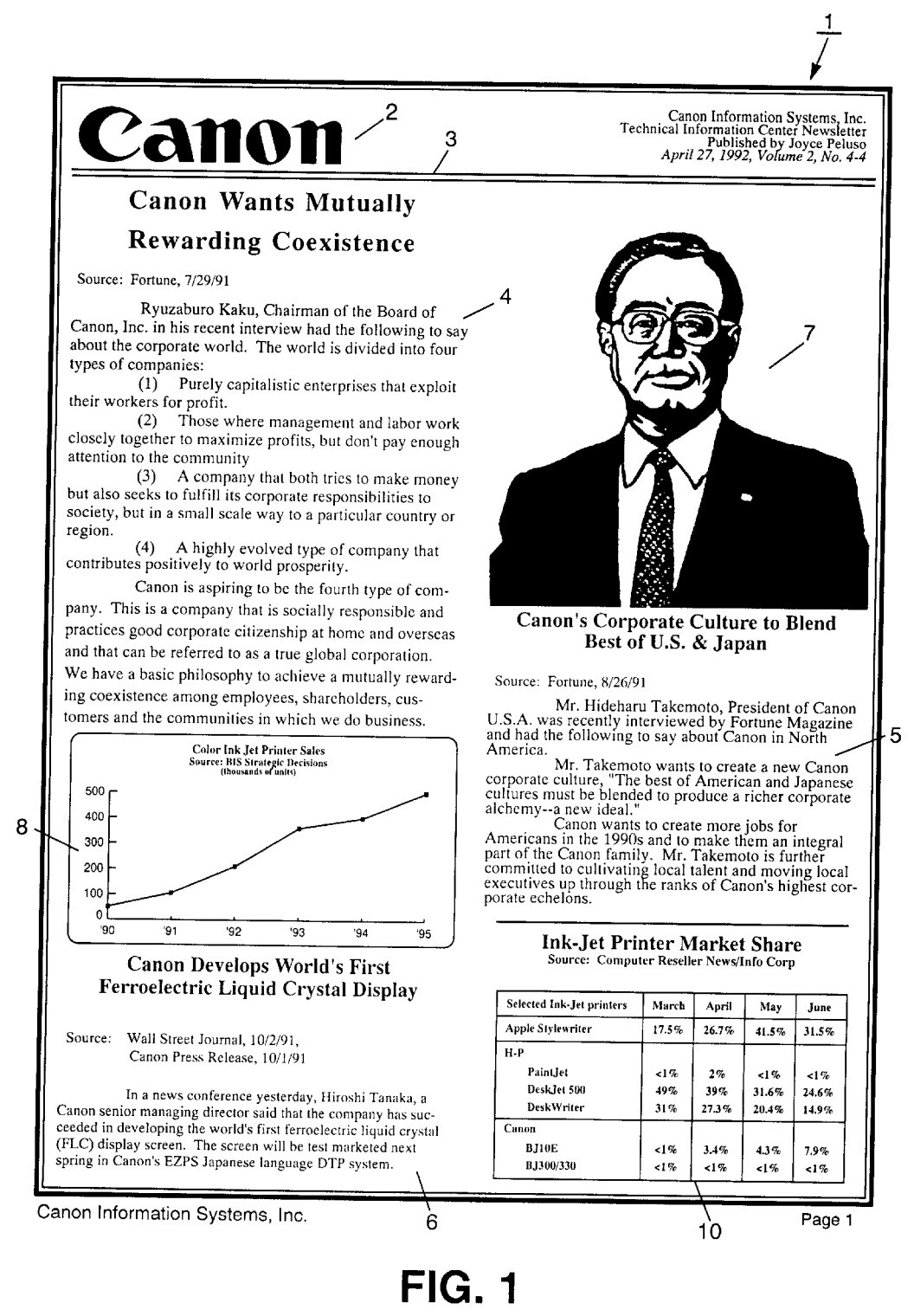

FIG. 1 shows the page of a representative document. Document page 1 is arranged in a two-column format. Page 1 includes title 2, horizontal line 3, text areas 4, 5 and 6, which include lines of text data, half-tone picture area 7, framed area 8, and table 10. According to the block selection techniques described in U.S. patent application Ser. Nos. 07/873,012 and 08/338,781, each area of document page 1 is designated in accordance with the type of image data located therein and image data is then segmented based on its respective type. As the block selection application processes a document page, a hierarchical tree structure is created as shown in FIG. 2.

In FIG. 2, hierarchical tree structure 20 contains a plurality of nodes which represent segmented blocks of image data of document page 1. Each node of the tree contains feature data which defines the feature of each block of image data in the processed document page. For example, the feature data may include block location data, size data, attribute data (image type such as text, picture, table, etc.), sub-attribute data, and child node and parent node pointers. In this regard, child or "descendent" nodes represent image data which exist entirely within a larger block of image data. For example, text blocks located in a table would be designated as child nodes of the table block. Child nodes are depicted in the hierarchical tree structure as a node branching from a parent node, such as the nodes at the same level as node 22, which branch from parent or root node 21.

Once a hierarchical tree structure, such as hierarchical tree structure 20, has been created, it is stored in memory. Upon receiving a request to process the image data in the document image, hierarchical tree structure 20 is retrieved from memory and image data which has been blocked together is processed according to the feature data stored in its corresponding node. For example, a user can extract data within various text blocks of a table in order to further process the data.

In addition to using the hierarchical tree structure to process image data of a document page, the hierarchical tree structure is used to generate and display a comprehensible format of document page 1, such as the display of block template 40 shown in FIG. 3. Block template 40 of the document page is generated and displayed to the user based on the feature data stored in the hierarchical tree structure shown in FIG. 2.

The block template of the document page directly reflects the structure of the hierarchical tree as well as the feature data stored in each node of the hierarchical tree structure. The feature data in the node is utilized to generate the block outline, location, and size. In addition, feature data in each node is used to identify the type of image data contained within the block. For example, as shown in FIG. 3, block template 40 includes text blocks 41, 42 and 43, each of which corresponds to nodes 28, 31 and 32, respectively. Also shown is table block 48 which includes text cells 49 which correspond to nodes 39A–39N, respectively.

However, in the foregoing block selection techniques, difficulties have been encountered. For example, erroneous block selection processing of image data identified as a table occurs when text data within the table is grouped separately or grouped together due to the errors in block selection techniques or due to poor scanning or printing of the analyzed document page. This results in poor post-processing of the table image data and text data therein. That is, when image data is identified as a table, the table includes text data which must be grouped together or separately within the table based on its column and row position in the table. This creates problems when text data is horizontally or vertically grouped and blocked with other text data which should not be included in the block or when text data should be horizontally or vertically grouped and blocked with other text data in the table.

SUMMARY OF THE INVENTION

The present invention addresses the foregoing difficulties by providing a feature extraction system which extracts image data within a table by defining columns and rows in image data identified as a table, assigning a row and column address to text data to be extracted from the table, and extracting text data from the table based on its column and row address.

According to one aspect of the invention, in a feature extraction system for analyzing image data of an input document image, a feature extraction method identifies image data as a table image and identifies text within the table image by performing the steps of inputting image data of a document page, performing block selection processing on the document page, the block selection processing identifying and separating the image data into blocks having the same image type, identifying table image data based on the separated blocks of image data, identifying text blocks within the table image data, horizontally sorting all text blocks located in the table image data based on horizontal position information, vertically sorting all text blocks located in the table image data based on vertical position information, separating text blocks into rows and columns based on a result of the vertical and the horizontal sorting steps, assigning column and row address coordinates to each text block in the table image data based on the separating step, and storing the assigned address of each text block.

According to another aspect of the present invention, a feature extraction method identifies table image data and locates text image data within the table by performing the steps of inputting image data of a document page, performing block selection processing so as to identify and separate image data into blocks having the same image type, identifying blocks of image data which contain table image data, locating text blocks within the table image data, horizontally sorting all text blocks located in the table image data based on horizontal position information, vertically sorting all text blocks located in the table image data based on vertical position information, separating text blocks into rows and columns based on a result of the vertical and the horizontal sorting steps, assigning address information to each text block in the table image data based on the separating step, and storing, in a node representing the block of table image data in the hierarchical tree, table address information and storing, in respective nodes representing text blocks branching from the node representing the table image data, text block address information.

BRIEF DESCRIPTION OF THE DRAWINGS

FIG. 1 is a representational view of a document page;

DETAILED DESCRIPTION OF THE PREFERRED EMBODIMENT

Figure 2:
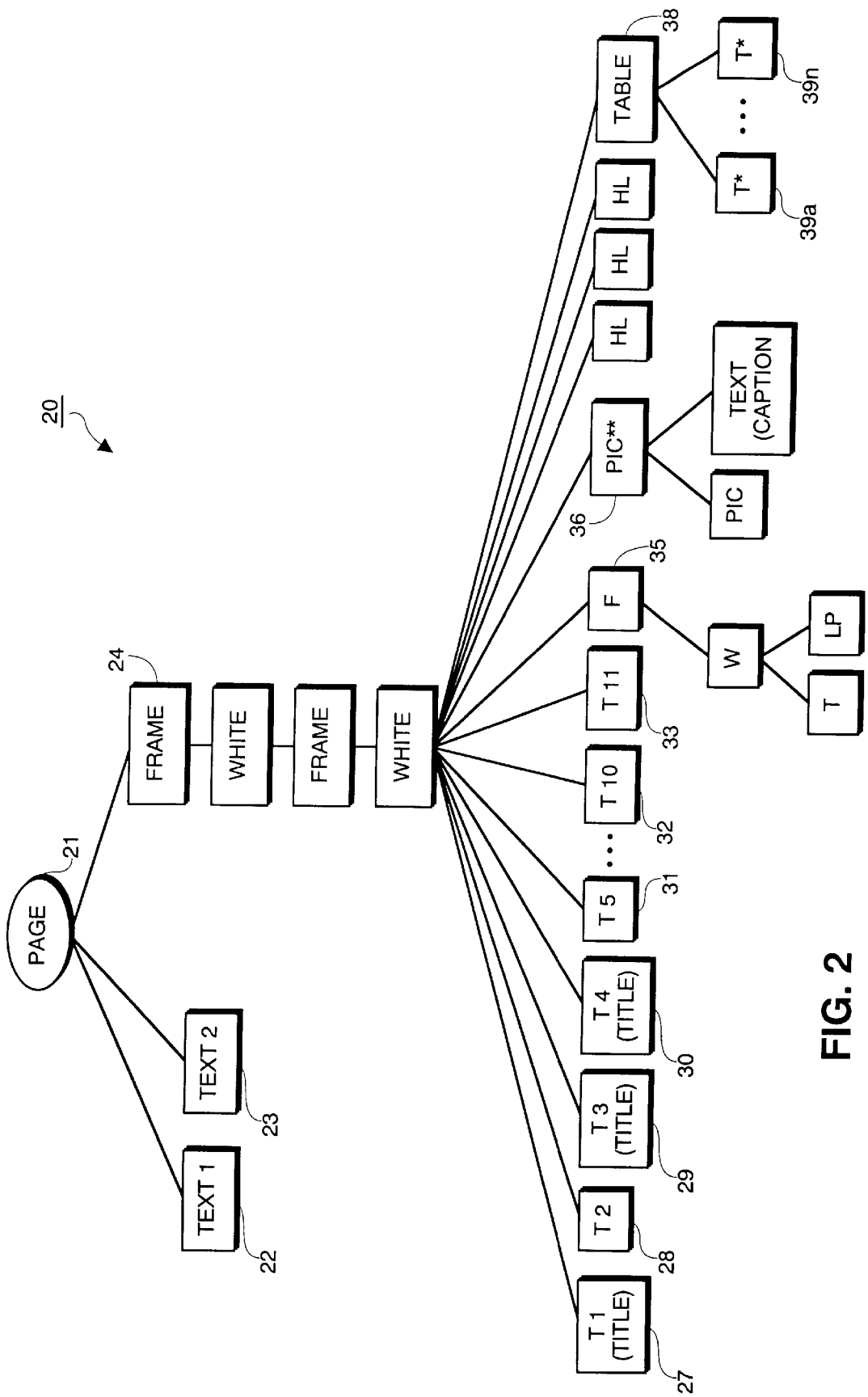
FIG. 2 is a representational view of a hierarchical tree structure resulting from block selection processing on the document page illustrated in FIG. 1.
Figure 3:
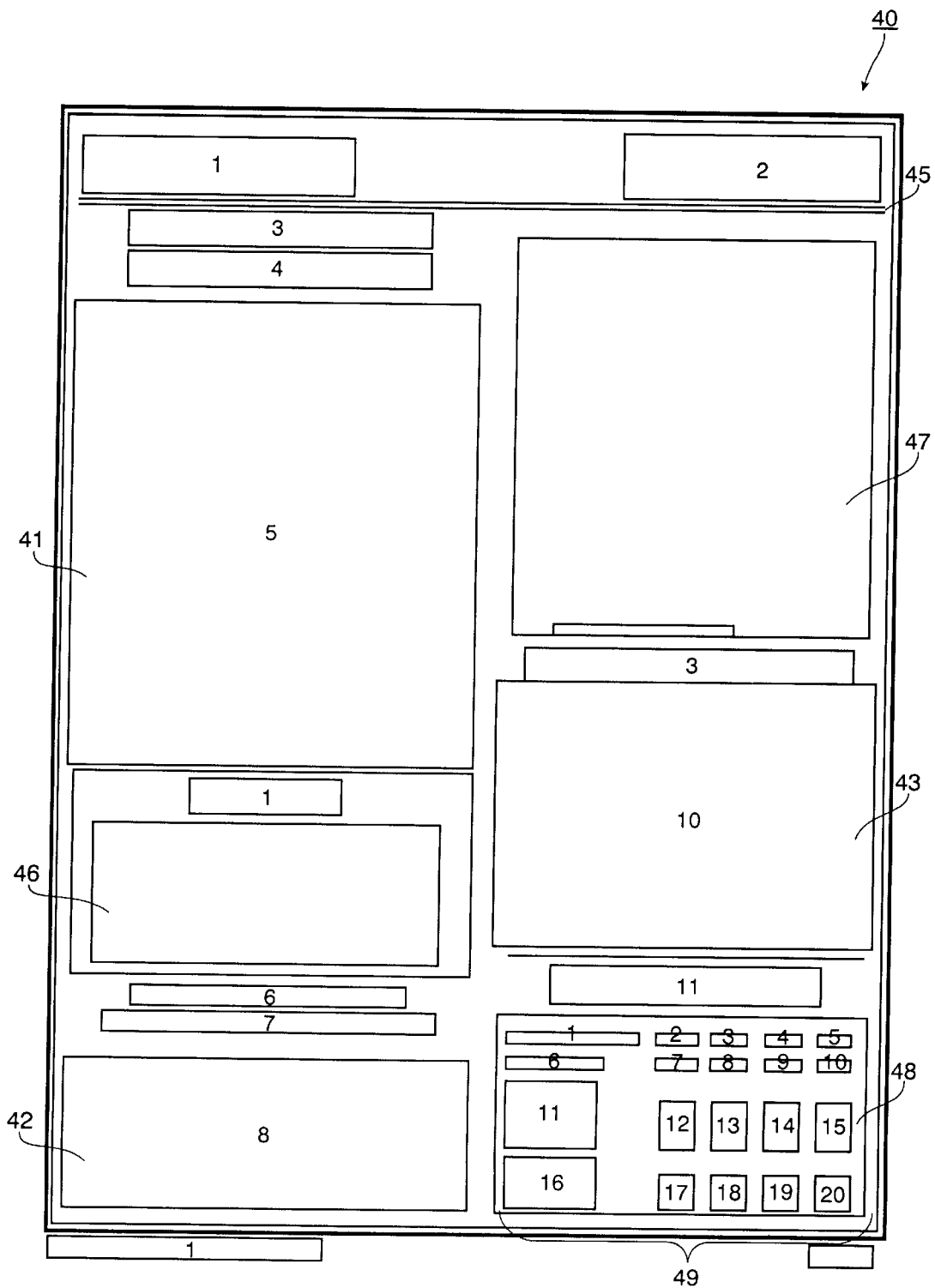
FIG. 3 is a view showing how the document page which is created based on the hierarchical tree structure shown in FIG. 2 might be displayed on a display screen.
Figure 4:
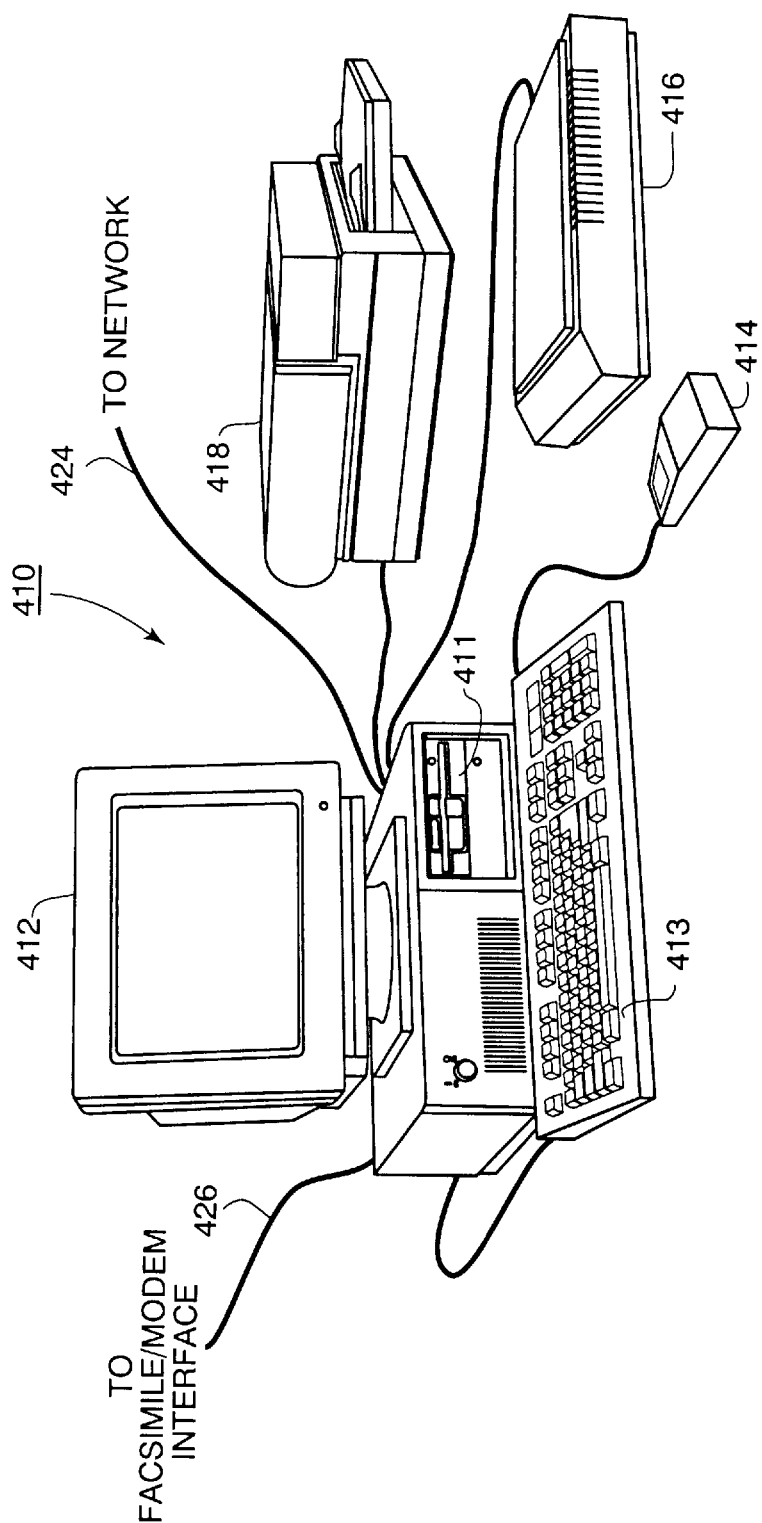
FIG. 4 is a perspective view showing the outward appearance of an apparatus according to the present invention.

FIG. 4 is a view showing the outward appearance of representative computing equipment which incorporates a block selection based table manipulation and text data extraction system according to the present invention.

Shown in FIG. 4 is computing equipment 410, such as an IBM PC or PC compatible computer having a windowing operation system such as Microsoft Windows Operating System. Computing equipment 410 is provided with either a monochromatic or color display monitor 412, on which computing equipment 410 displays images to the user. Computing equipment 410 is further provided with fixed disk drive 411 for storing data files and application program files, keyboard 413 for permitting input text data and manipulation of objects displayed on display screen 412, and pointing device 414, such as a mouse, which is provided by pointing and for manipulating objects displayed on display screen 412.

A multi-page document is input by scanner 416 which scans each page of the document or other images and provides a bitmap image data of those pages to computing equipment 410. The image data is stored into disk 411 in either compressed or uncompressed format.

A conventional color printer 418 is provided for outputting documents processed by computing equipment 410.

Also provided are network interface 424 for interfacing with a local area network, and facsimile/modem interface 426 for sending and receiving facsimile messages and other data files via a facsimile/modem.

In accordance with operator instructions, and under control of the windowing operating system, stored application programs, such as desktop publishing programs, drawing application programs, and block selection applications, are selectably activated to process and to manipulate data. Also in accordance with operator instructions and based on those stored application programs, commands are issued to display images on monitor 412 and to print images appearing on monitor 412 by printer 418.

Most typically, the applications stored on computer disk 411, including the block selection program of the present invention, have been stored on disk 411 by downloading each application from a computer-readable medium, such as a floppy disk, a CD-ROM or a computer bulletin board.

Figure 5:
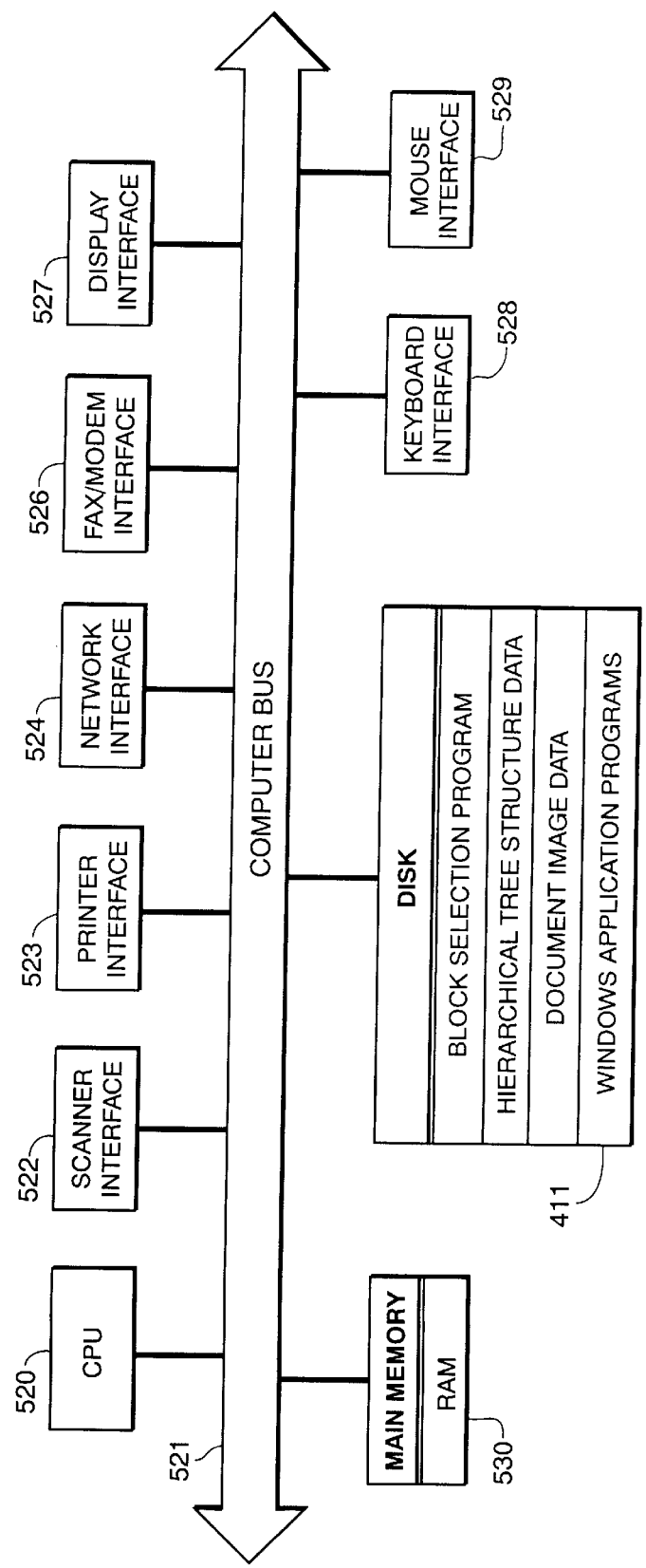
FIG. 5 is a block diagram of the FIG. 1 apparatus.

FIG. 5 is a detailed block diagram showing the internal construction of computing equipment 410. As shown in FIG. 5, computing equipment 410 includes a central processing unit (CPU) 520, such as a programmed microprocessor, interfaced to computer bus 521. Also interfaced to computer bus 521 is scanner interface 522, printer interface 523, network interface 524, fax modem interface 526, display interface 527, keyboard interface 528 and mouse interface 529.

Main memory 530, such as random access memory (RAM), interfaces to computer bus 521 so as to provide CPU 520 with access to memory storage. In particular, when executing stored application program instruction sequences, such as those associated with application programs stored on disk 411, CPU 520 loads those instruction sequences from disk 411 (or other storage media such as media accessed via network interface 524 or via a floppy disk drive (not shown)) into main memory 530 and executes those stored program instruction sequences out of main memory 530.

[Table and Text Block Identification Using Block Selection]

Briefly, the present invention provides a computer-implemented method which locates and identifies table cells of text in each text block within image data identified as a table and determines whether that text block can be sub-divided into one or more additional columns and rows depending on the location of the table cells of text in the text block.

According to the present invention, once a table has been located in image data, text blocks in the image data are identified using known-block selection techniques such as those discussed previously. Upon identifying text blocks, the text blocks are sorted based on horizontal and vertical positional information within the document page and then assigned address coordinates based on row and column location in the table. Once assigned address coordinates, each text block is analyzed again to locate text blocks having an address range, such as a column address range, a row address range, or both. Text blocks having an address range are subjected either to vertical or horizontal separation processing based on the type of address range (for example, row address range, receives vertical separation processing) in order to determine if the text block can be sub-divided into smaller text blocks by inserting column and row separators between table cells of text in the text block. If sub-divided, each text block is assigned address coordinates within the table based on the newly positioned column and row separators. The address coordinates of all text blocks are then stored in order to update the hierarchical tree structure in accordance with known block selection techniques.

Figure 6A:
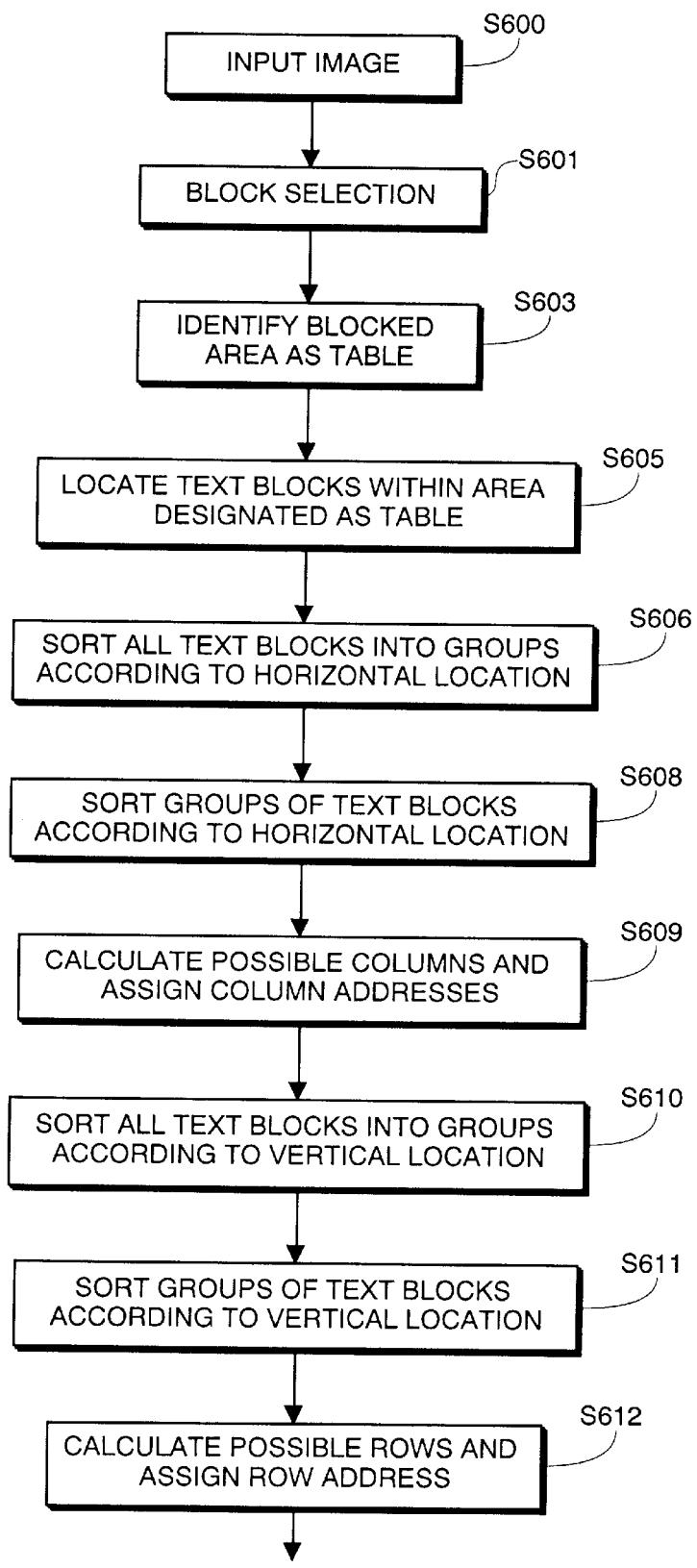
FIGS. 6A and 6B comprise a flowchart showing the method for performing table analysis and manipulation utilizing the block selection technique of the present invention.
Figure 6B:
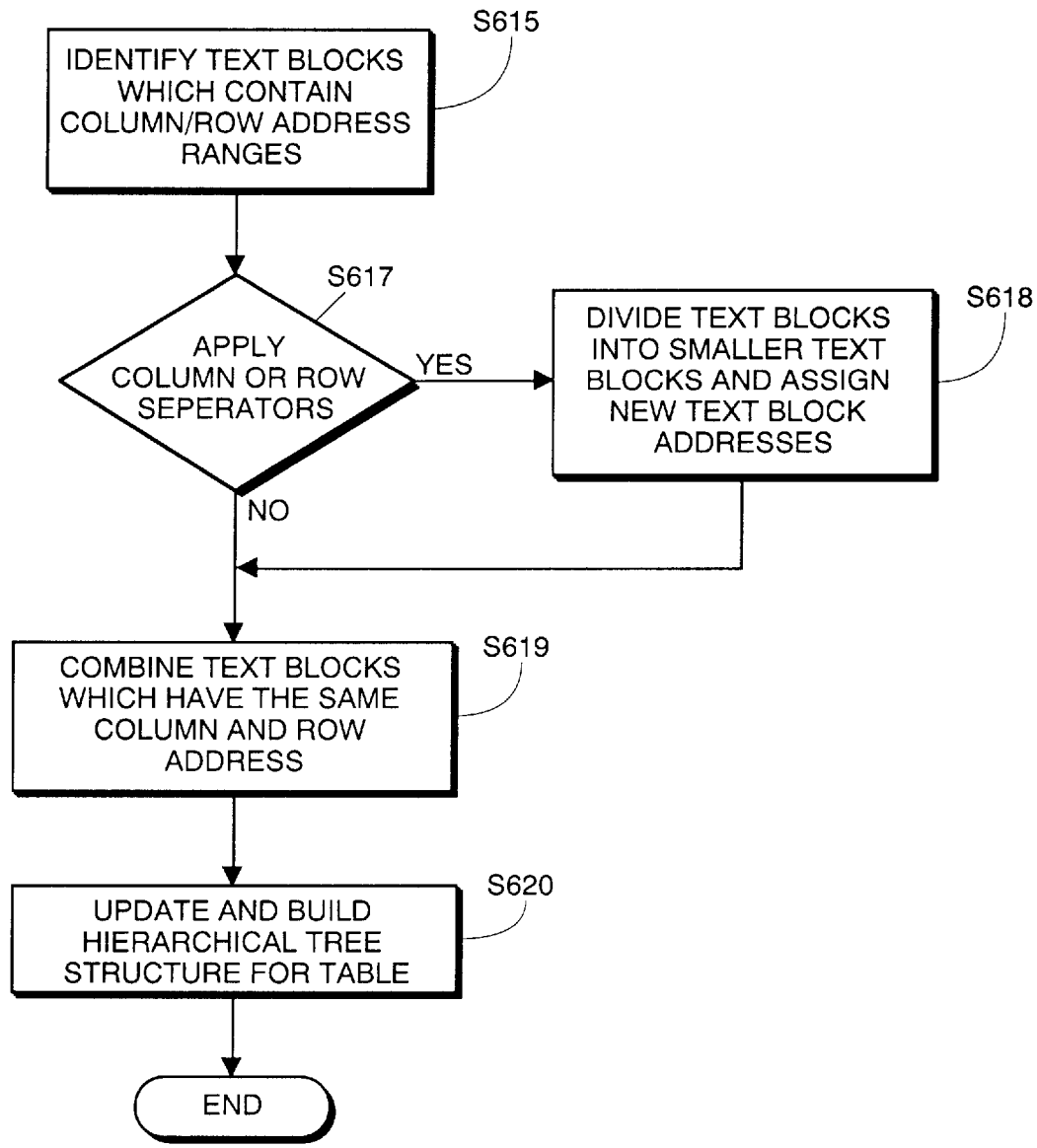

FIGS. 6A–6B comprise a flowchart showing the method for performing table identification, and text block sub-division and text block addressing using the block selection application according to the present invention. The process steps shown in FIG. 6A–6B are executed by CPU 520 in accordance with a computer process steps stored in disk 411.

In step S600, pixel image data of a document page is input into the system and then stored in disk 411. Image data is a pixel-by-pixel representation of the image, preferably the pixel data is binary pixel data, that is, black and white image data which has been input through scanner 416, through network interface 424 or through facsimile/modem interface 426. In step S601, the block selection application is launched. For the sake of brevity, a description of block selection initialization and processing of an entire document page of different image types will not be provided herein. Rather, a description of how block selection and analysis of image data identifies a table will be described. For a detailed description of how block selection techniques distinguish between image data within an entire document page, block selection techniques disclosed in Ser. Nos. 07/873,012 and 08/338,781 should be reviewed. The present invention is directed to identifying image data as a table and to sub-dividing, if necessary, text blocks which span more than columns and/or rows of the table into smaller text blocks and within the table once the block selection process has sub-divided a text block.

[Table Identification]

A brief description will now be provided as to how block selection identifies a blocked area as a table in step S603. For a more detailed description of this processing, the block selection technique disclosed in Ser. No. 07/873,012 should be reviewed.

Thus, in step S603, when framed data is located using one of the block selection techniques discussed above, it is analyzed to determine if the frame is a "frame-table" or a "frame-halftone". Accordingly, the frame data is further processed to determine if it includes table or tabularly organized data by inspecting the interior of connected components to obtain white contours which are white pixels that are inspected rather than black pixels. In this regard, the interior of a non-text unit is scanned in a first direction from a bottom right-hand portion of an interior of the non-text unit toward an upper left-hand portion. When a first white pixel is encountered, adjacent pixels to the white pixel analyzed are in an order similar to a starburst-like pattern. Accordingly, white contour tracing according to the starburst-like pattern is performed in a four direction vector. White contour tracing is continued in the four directions until all white contours are enclosed by black pixels or traced. After each white contour is located, scanning proceeds as discussed above in the first direction until all white contours enclosed in a non-text object have been traced.

At this point, a density of the non-text unit is calculated by counting the number of black pixels within the connected component, and dividing the number of block pixels by the total number of pixels enclosed by the rectangular. The number of white contours found within the non-text unit are inspected. If the number of white contours is greater than or equal to a predefined number, then there is a possibility that the non-text images, in fact, are a table or tabularly arranged series of text blocks.

Next, the white contour filling rate is determined. The white contour filling rate is the degree to which white contours fill the area enclosed by the non-text image. If the filling rate is high, then it is probable that the non-text image is a table or tabulated arranged sequence of text data. However, if the filling rate is low, then it is most likely not a table or tabularly arranged sequence of text data.

If the filling rate is high, then it is probable that non-text image is a table or tabulated arranged sequence of text data. To increase the confidence in this determination, the white contours are inspected to determine if they form a grid-like structure extending both horizontally and vertically. Specifically, non-grid arranged white contours get recombined if their boundaries do not extend horizontally and vertically across at least two contours. White contours for a table are not likely to recombine, whereas white contours for a non-table, for example, a halftone image or a line drawings, are more likely to recombine. Accordingly, the recombination rate is inspected.

If the recombination rate is high or if the number of white contours remaining after recombination is greater than a predetermined number, then the non-text unit is designated as a halftone image or a line drawings. However, if the recombination rate is less than the predetermined number, then the non-text image is designated as a "table".

[Text Block Identification, Sub-Division and Addressing]

Now, once the frame area has been designated as a table, in step S605 text blocks within the area designated as a table are located. That is, the interior of the newly designated table area is inspected so as to detect and to classify connected components in eight directions. The process for locating text blocks in a table is described further in U.S. patent application Ser. No. 07/873,012.

From the block selection process, the identified table may contain a plurality of text blocks inside the table. However, the text blocks are randomly processed and are assigned position information based on a location within the document page. As a result, the text blocks are not placed in a column/row order within the table, but rather branch randomly from the table node when stored in the hierarchical tree structure. This means that for each of the text blocks within the table, it is possible that other text blocks can be located within the same isolated white area, which is due to editing style, or poor printing or scanning of the document page. Accordingly, text blocks may contain more than one table cell of text in either the horizontal or the vertical direction or both. That is, after block selection, each text block within the table should correspond to only one table cell. However, as stated above, one text block may contain more than one table cell content in either the horizontal or vertical direction or both. And, one table cell content may be split into more than one text block.

In order to properly extract specific text data from the table for post-processing purposes, the present invention analyzes the table cell structure and assigns column and row address coordinates to text blocks and then analyzes text blocks in order to determine if a text block containing one or more table cells can be further divided into smaller text blocks.

Figure 7:
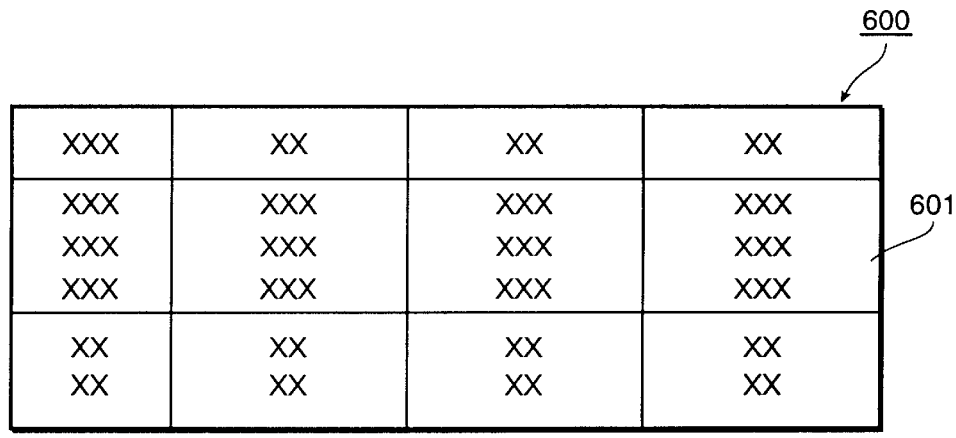
FIG. 7 illustrates an example of a basic table structure.

Thus, in step S606, analysis of the table structure is performed. However, prior to analyzing the table structure, a description of a table will be defined. A basic table structure is defined as shown in FIG. 7. As shown in FIG. 7, table 600 is defined by five grid lines, which make up four columns and three rows. Each text block is assigned positional information from the block selection processing. The positional information relates to the text block location in the analyzed document page rather than a position relative to the table. In addition, as shown in FIG. 7, table 600 includes multiple text lines in rows 2 and 3. Accordingly, without the present invention, in order to extract and post-process only one line of the multi-line row, for example, table cell 601, the entire table cell or text block would have to be extracted. However, after applying the method of the present invention, table cell 601 as well as the remaining text lines in rows 2 and 3 would be further sub-divided into individual rows or text blocks, thereby permitting individual lines within a row to be extracted.

Thus, in step S606, all text blocks in the identified table are sorted based on horizontal positional information. For example, all text blocks residing in the first column are grouped together. To accomplish this task, a block having the furthest left coordinate is selected as being in group 1. Then, all other text blocks are compared to the group currently being formed using a maximum horizontal overlapping method. That is, a maximum horizontal overlapping rate of the currently formed group and the selected text block are compared to a predetermined threshold "t_h". The maximum overlapping rate is determined by the following equation:

max_h_overlapping=max(horizontal overlapping area/width of currently formed group, horizontal overlapping area/width of selected text block)

If max_h_overlapping is greater than "t_h", then the selected text block is placed in a currently formed group and the group horizontal coverage is updated. If no overlapping occurs or the maximum overlapping is less than "t_h", then the selected text block is placed into a separate group. All text blocks in the table are analyzed using the same method.

Once all the text blocks have been sorted into similar groups according to horizontal location, in step S606, a group of text blocks are sorted in order to determine sequential order of the group in the table. This is performed by analyzing the horizontal location information (step S608).

Figure 8A:
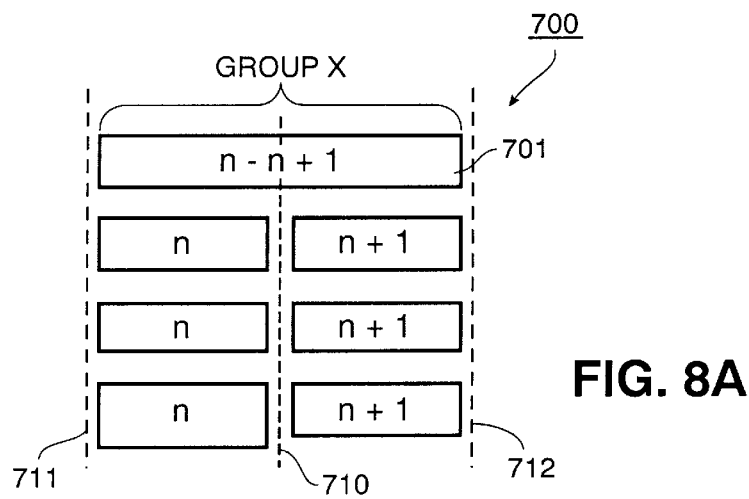
FIGS. 8A and 8B are representational views of a group of text blocks which can be split into two form columns in a table.
Figure 8B:
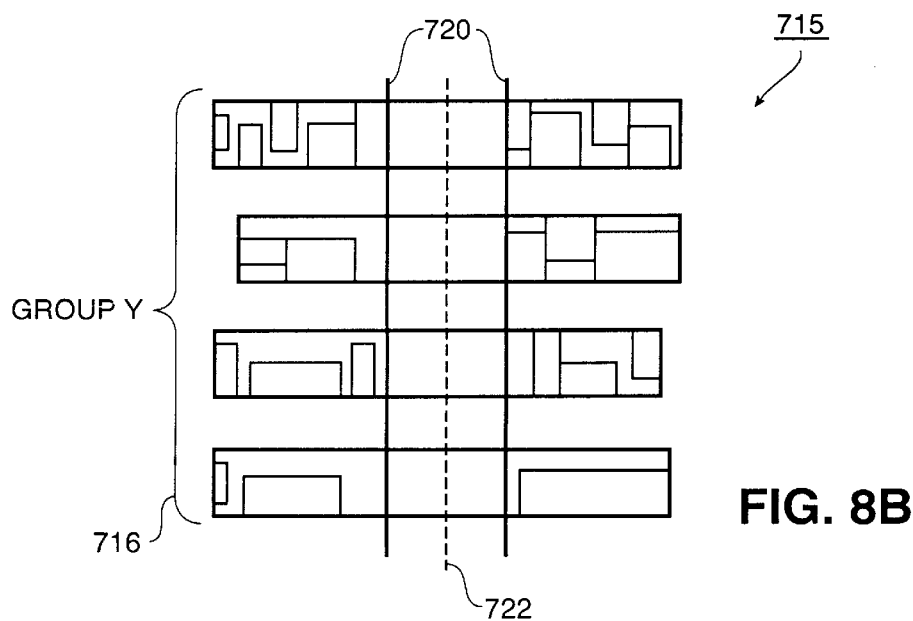

Based on the sorting performed in step S608, in step S609, columns for the table are calculated based on separations or gaps inside each text block group. Specifically, the text blocks inside each group are assumed to belong to one column area, based on positional information, and are determined to be in one column of the table. However, there are situations, for example, as shown in FIGS. 8A and 8B, in which text blocks in the same group belong to more than one column area and cannot be easily separated since they span one or more columns.

In such instances, the block selection process of the present invention locates these text blocks which overlap a column area in order to determine where the text block begins and ends. In order to accomplish this task, it is determined where a column or columns can intersect the text block which spans more than one column area. Based on this determination, a column range can be determined. Once each text block which overlaps a column area is located and analyzed, each text block is assigned a column address range based on the relative location between the block and the adjacent groups on either side. Similarly, the remaining non-spanning text blocks are assigned a column address. For example, as shown in FIG. 8A, text block 701 spans a gap between two columns of neighboring text blocks within the same group, and, accordingly, a column address range is assigned to text block 701. That is, text block 701 is assigned a column address range of (n, n+1), wherein n−1 is the last column number of the previous group.

How to sort text blocks (S606) and groups of text blocks (S608) based on horizontal location and how to calculate and assign column addresses (S609) is explained in greater detail in connection with FIG. 6C, described below.

Figure 6C:
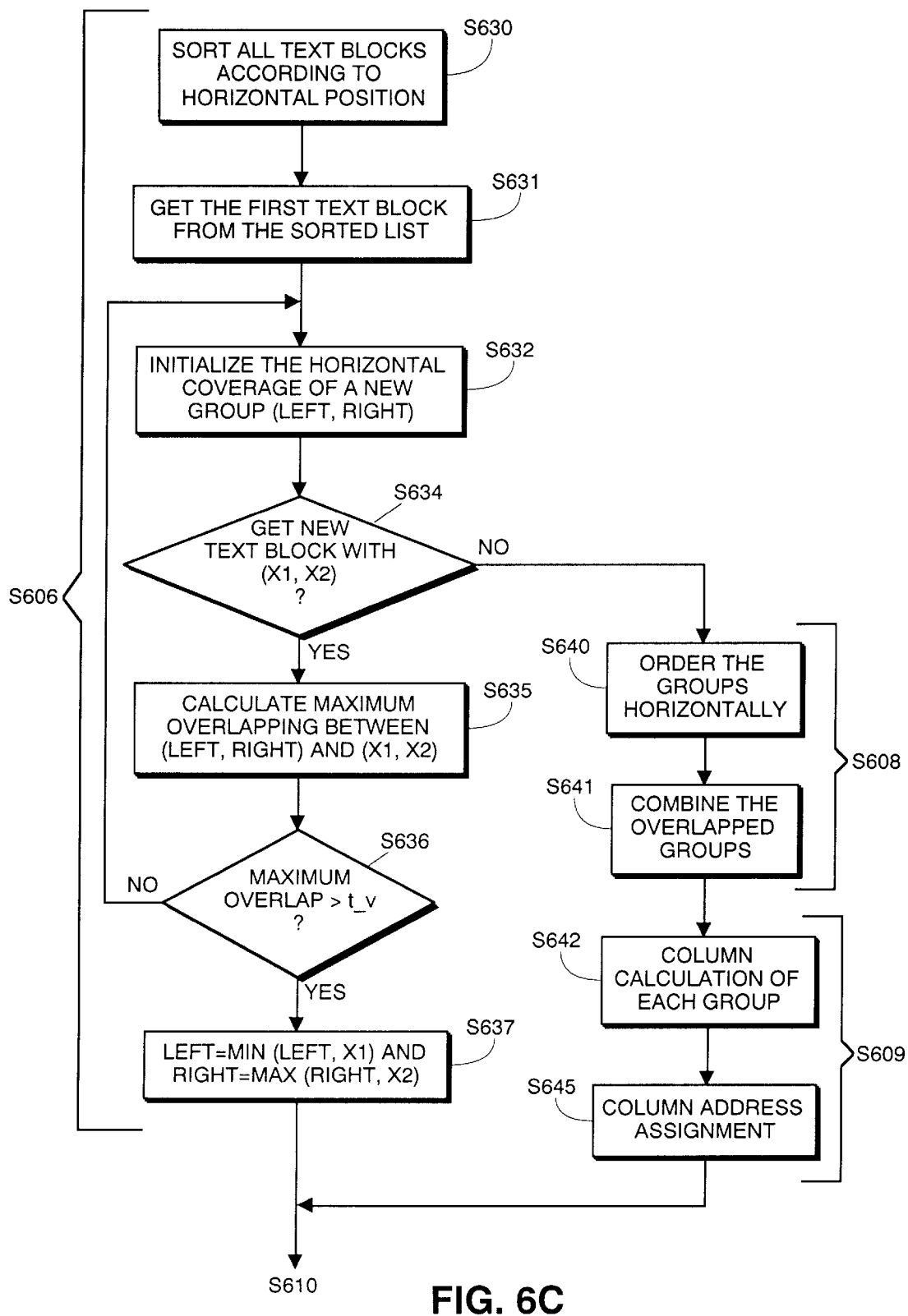
FIG. 6C is a flow diagram for showing the detailed processing that was referred briefly to in steps S606–S609.

FIGS. 6C is a flow diagram for explaining in greater detail the process performed in steps S608–S609.

Referring to FIG. 6C, after block selection is performed on the table structure and text blocks are defined in the table, the coordinates of each of the text blocks are utilized in step S630 to sort all text blocks according to their horizontal position. Specifically, the left-hand coordinate of each text block in the table is examined to determine which block is the furthest left within the table. The text block having the furthest left location is placed at the beginning of a sort list. Each of the text blocks thereafter are analyzed based on their left-hand coordinate to determine its place within the sort list. For example, a text block having coordinates of (1,1) will be placed at the beginning of the list whereas a text block having the coordinates of (3,5) will be placed at the middle or end of a sort list. Accordingly, each text block is sorted based on their horizontal location.

In step S631, the first text block in the sorted list is retrieved and is placed in the first group (column). Utilizing the coordinates of the first text block in step S632, the horizontal coverage of the first group is initialized as the first block and used to begin a comparison process between the remaining text blocks. In step S634, it is determined if there are other text blocks within the table and, if so, in step S635, the coordinates of the next text block are retrieved and compared to the horizontal coverage of the group currently being formed in order to determine whether the next text block resides in the same group as the last text block. In order to perform the comparison, a maximum horizontal overlapping rate of the current group and the next text block are examined.

If the maximum overlap is greater than a predetermined threshold "t_h", then the right-hand horizontal coverage or coordinate is reset based on the right hand coordinate of the next text block which is analyzed in step S636. That is, the right-hand coordinate of the next text block which was analyzed can be used to determine a new horizontal coverage of the group. On the other hand, if the maximum overlap is not greater than the predetermined threshold "t" in step S636, flow returns to step S632 and the next text block begins a new group and a new group horizontal coverage is initialed in step S632.

Reverting back to step S634, in the case that no additional text blocks remain in the table, flow proceeds to step S640 in which the groups of text blocks are ordered horizontally. In step S641, if any overlapped groups exist, they are combined. Specifically, in the case that neighboring groups horizontally overlap to a predefined threshold "x_h", these groups are combined into one group. In step S642, column separators are placed between groups and inside some groups, if necessary, based on text block assignments. Specifically, in step S642, the width and length of a gap is examined. That is, in the case that the width meets a predefined criteria "w" and the length of the gap meets a predefined criteria "l", then it is determined that a column separator can be inserted into a group. On the other hand, if the gap does not meet one or both of the width and length criteria, then no column separator is inserted inside the group. In step S645, column addresses are assigned to text blocks based on the column separators. In this regard, column separators are put between groups by default, and column separators may be put inside some groups in which column calculation (step S609) determines that a group contains more than one column span.

Reverting back to FIG. 6A, in step S610 once all possible columns are calculated in step S609, all text blocks are sorted into groups of rows according to a vertical positional information. Row analysis is performed similar to column analysis performed in steps S606–S609. Specifically, in step S610, all text blocks are sorted into groups according to vertical positional information. Once again, text blocks are placed into different groups in which each text block has some vertical overlapping with another text block of the same group which is either closely to the right or to the left of it. As stated previously, the maximum vertical overlapping rate of the text block and the group currently formed is compared to some predetermined threshold "t_v".

max_v_overlapping=max(vertical overlapping area/length of currently formed group, vertical overlapping area/length of text block selected)

In step S611, the groups of text blocks are then sorted based on the vertical coverage of each group. Row separators are calculated for each group, and once again, text blocks inside each group are assumed to belong to one row area and each text block therein is assigned a row address in step S612. Once again, text blocks overlapping a row separator is assigned a row address range.

How to sort text blocks (S610) and groups of text blocks (S611) according to vertical location and how to calculate and assign new addresses (S612) is explained in greater detail in connection with FIG. 6D, described below.

Figure 6D:
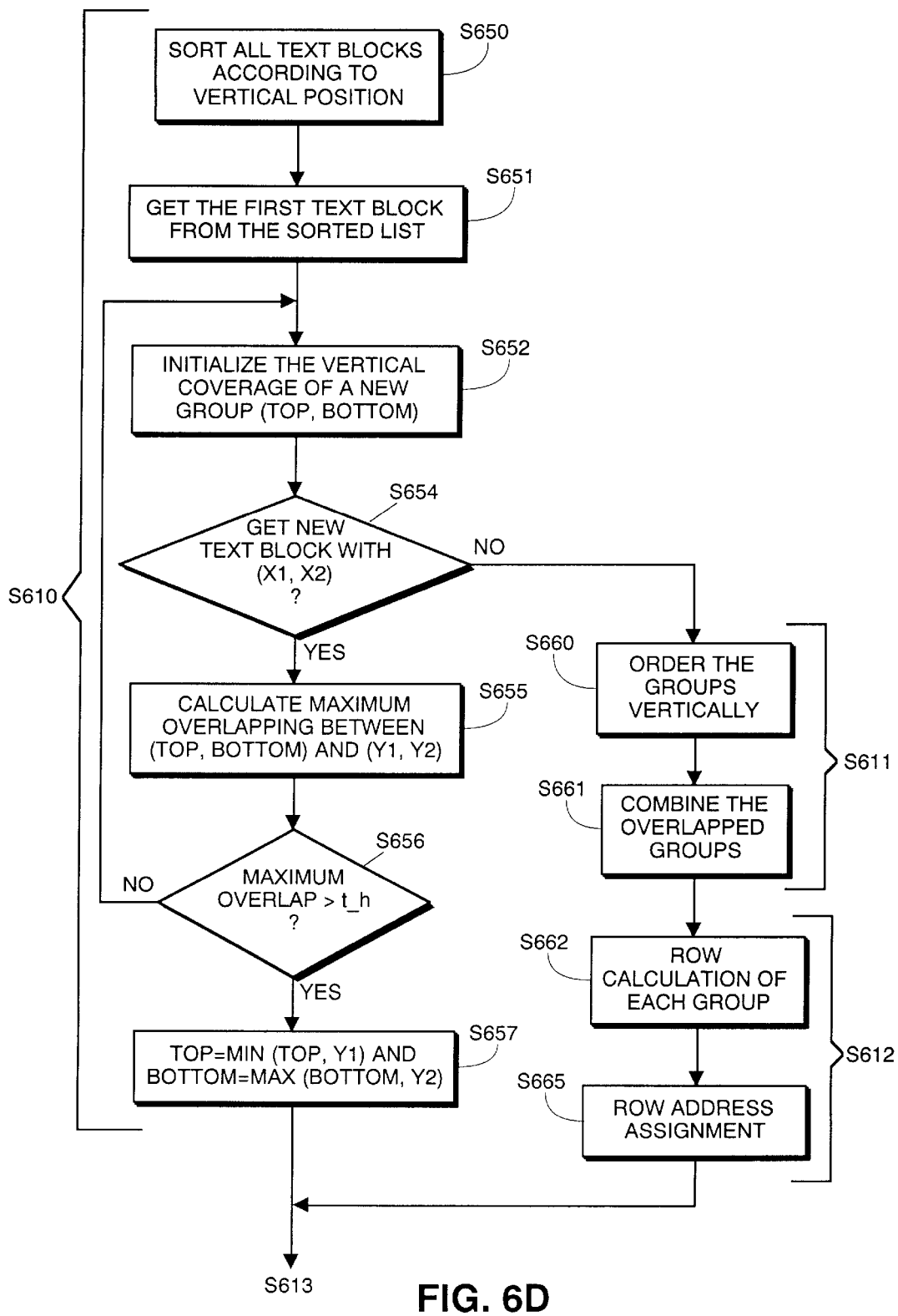
FIG. 6D is a flow diagram for showing the detailed processing that was referred briefly to in steps S610–S612.

FIG. 6D is a flow diagram for explaining in greater detail the process defined in steps S610–S612.

Referring to FIG. 6D, after column analysis, the text block coordinates are used for row analysis. Specifically, in step S650, row analysis begins by examining the top coordinate to determine which block is the closest to the top of the table. The text block which is at the top location of the table is put at the beginning of the sort list. Each of the text blocks thereafter are analyzed based on their top coordinate to determine its place within the sorting list. For example, a text block having coordinates of (1,1) will be placed at the beginning of the list whereas a text block having the coordinates of (3,5) will be placed at the middle or end of a sort list. Accordingly, each text block is sorted based on their vertical location.

In step S651, the first text block in the sorted list is retrieved and is determined to be in the first group (row). Utilizing the coordinates of the first text block in step S652, the vertical coverage of the first group is initialized as the first block and used to begin a comparison process between the remaining text blocks in the table. In step S654, it is determined if there are other text blocks within the table and, if so, in step S655, the coordinates of the next text block are retrieved and compared to the vertical coverage of the currently formed group in order to determine whether the next text block resides in the same group as the last text block. In order to perform the comparison, a maximum vertical overlapping between the currently formed group and the next text block are examined.

If the maximum overlap is greater than a predetermined threshold "t_v", then the vertical coverage or bottom coordinate may be reset based on the next text block which is analyzed in step S656. That is, the bottom coordinate of the next text block which was analyzed can be used to determine a new vertical coverage of the group. On the other hand, if the maximum overlap is not greater than the predetermined threshold "t_v" in step S656, flow returns to step S652 and the next text block begins a new group and a new group vertical coverage is initialized as the next text block in step S652.

Reverting back to step S654, in the case that no additional text blocks remain in the table, flow proceeds to step S660 in which the groups of text blocks are ordered vertically. In step S661, if any overlapped groups exist, they are combined. Specifically, in the case that neighboring groups vertically overlap to a predefined threshold "x_v", these groups are combined into a single group. In step S662, row separators are placed between groups and inside some groups, if necessary, based on the assigned groups. In step S665, once the row calculations of each group has been performed, row address assignments are provided in accordance with the number of row separators between groups.

After column and row analysis, each of the text blocks have been assigned a column and row address coordinates. For example, in table 800, block 801 is assigned row/column address (1,1), block 802 is assigned row address and column address and address range (1, 2–4), block 803 is assigned (2,1), block 804 is assigned row/column address (2,2), block 805 is assigned row/column address (2,3), and block 806 is assigned row/column address (2,4). In addition, large text block 808 is assigned both a row and column address range (4–7, 2–4).

Figure 10A:
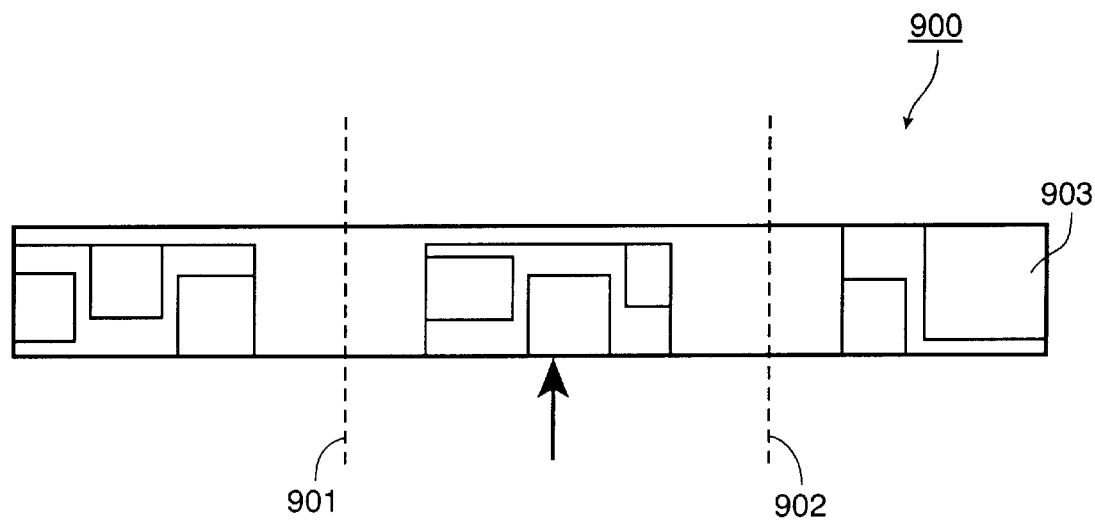
FIGS. 10A and 10B are representational views of a group of text blocks which have column address ranges and which can be sub-divided into separate columns.
Figure 10B:
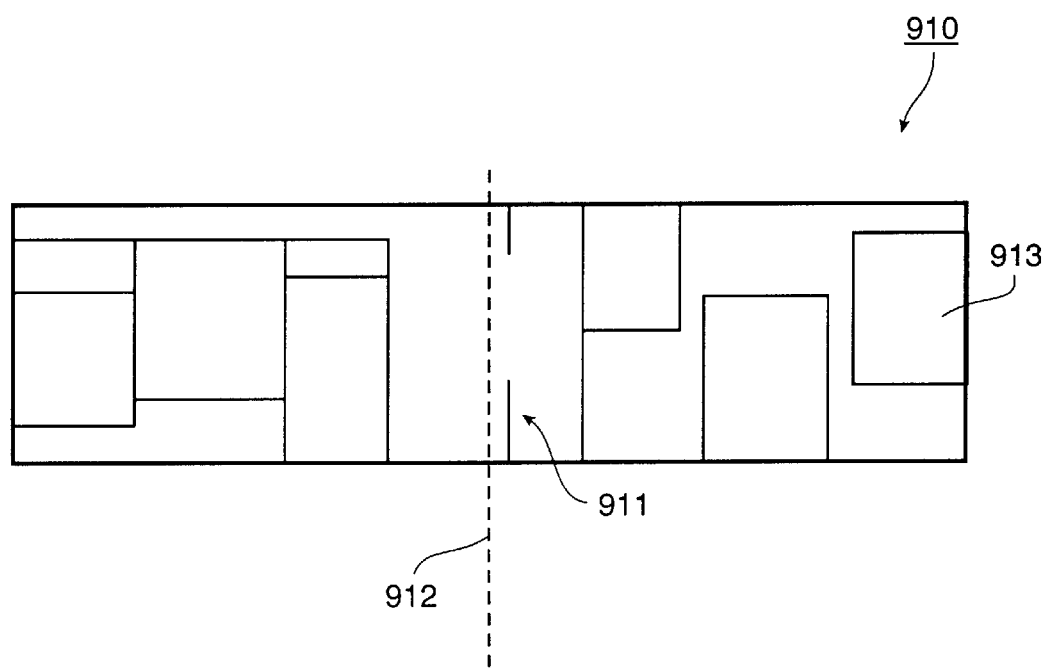

Once the text block column and address coordinates have been assigned, in step S615, the block selection process of the present invention locates text blocks which span gaps and contain either a column address range or a row address range. These text blocks are analyzed again to determine if they can be sub-divided by using the column and row separation process to determine if column or row separators can be inserted within the range address of the text block. Specifically, in step S617, it is determined if there is a large horizontal gap around a column separator, as shown in FIG. 10A or if there is an incomplete vertical grid line around a column separator as shown in FIG. 10B. The same procedure is then performed for row separators.

Thus, in step S617, it is determined if a separator can be inserted into the text block having an address range. If row or column separators can be applied in step S618, the text block is divided into smaller text blocks. That is, the text block itself is divided into at least two columns or rows. Each new text block is then assigned an address after the column separator or row separator has been applied. In the example shown in FIG. 8A, text block 701 in group 700 spans a narrow gap within the group. Using the column or row separator method, the width and length of the gap is analyzed to determine if column separator 710 can be placed therein. If column separator 710 can not be placed therein since the gap width does not meet a predefined criterion, the text block can not be sub-divided by a column separator. In FIG. 8A, column separators 711 and 712 indicate columns which separates group 700 from another group. Using these separators as boundaries to a column, each text block in group 700 is given a column address assignment.

As shown in FIG. 8B, there is another example in which there is a gap existing between two vertical lines 720 in group 716 of text blocks. In this situation, after the gap is analyzed it is determined that the gap has a certain width and length which is equal to or greater than a predefined criteria. Accordingly, each text block which has a column address range of (Y–Y+1), where Y–1 is the last column number of the previous group, is separated into two smaller text blocks since in each block a wide gap exists around the column separators. That is, column separator 722 shown as a dotted line is inserted to separate each text block into two smaller text blocks. Thereafter, each text block is assigned a new column address based on the sub-division.

Figure 9A:
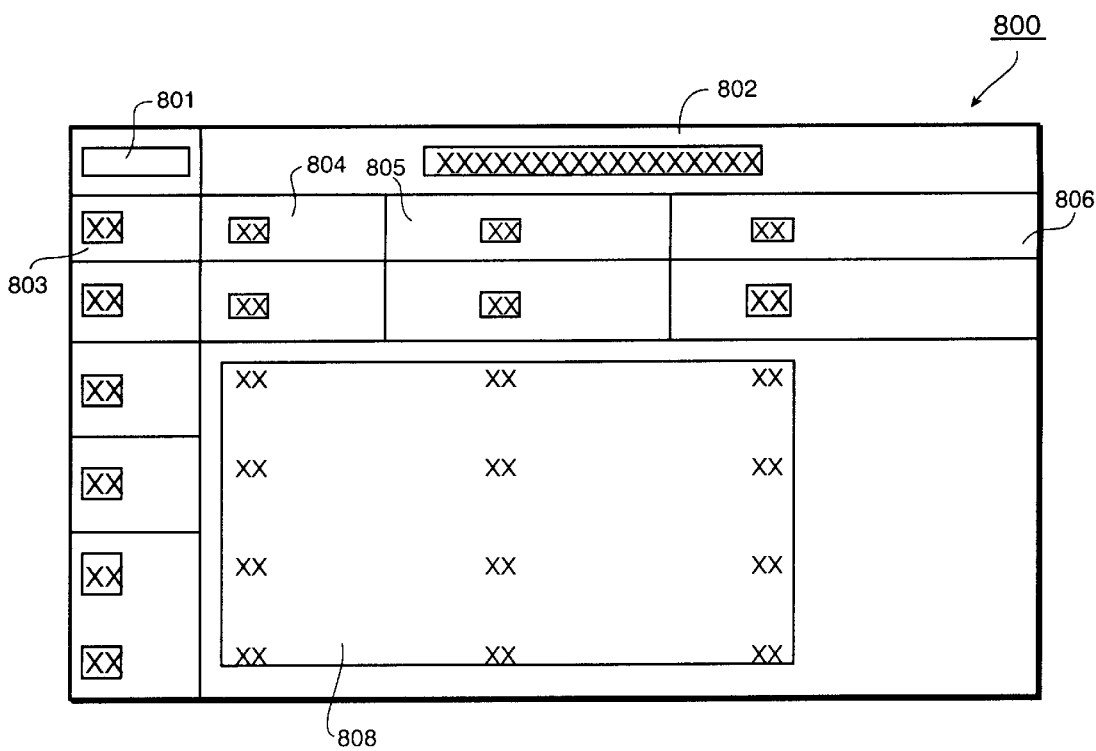
FIG. 9A is a representational view of a table before undergoing column and row analysis processing according to the present invention and FIG. 9B is a representational view of that same table after column and row analysis.
Figure 9B:
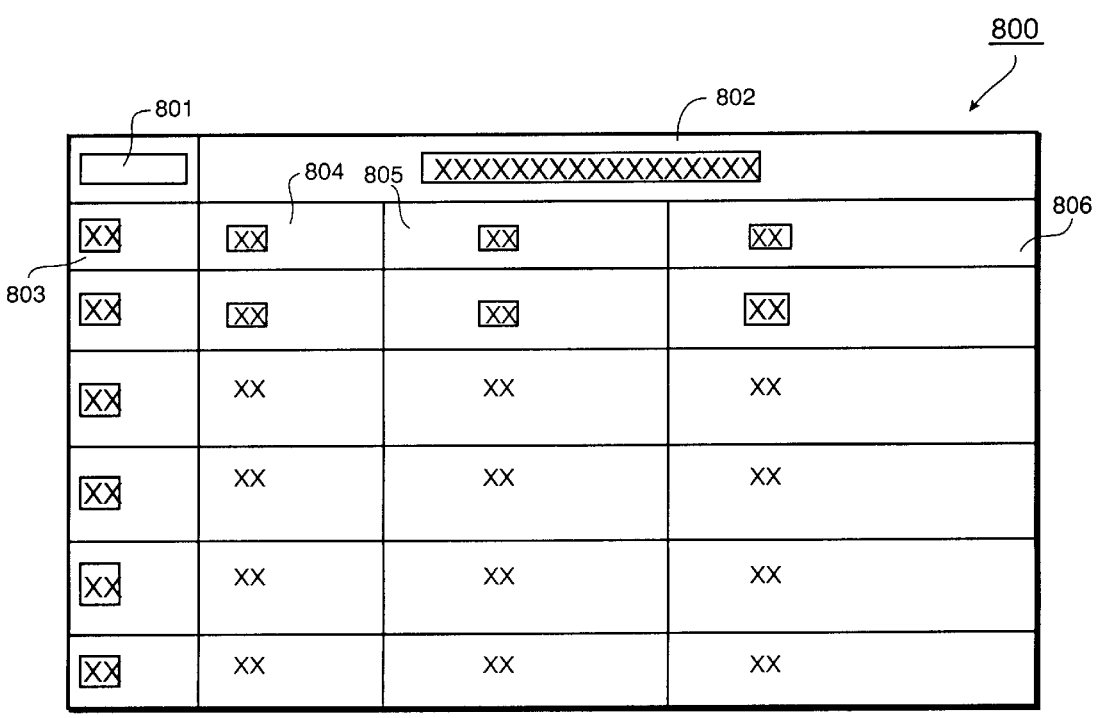

In FIG. 9A, text block 808 has both a column and range address and also contains more than one table cell. Accordingly, this type of text block is a good candidate for further sub-division using the column and row processing. Thus, after applying column and row processing, text block 808 is sub-divided into 12 new text blocks as shown in FIG. 9B. Each new text block is then assigned an address based on its column and row in the newly divided table 800.

In step S618, if the text block with a column address range has "n" column separators, then it will be determined that this text block actually contains, at most, (n+1) column contents. For example, as shown in FIGS. 10A and 10B, if a text block includes more than one column separator, then the column separators are used to cut the text block into different columns and smaller text blocks are formed. As shown in FIG. 10A, there exists a large gap. In the example, this gap meets the width criterion and, as a result, column separators 901 and 902 are inserted in order to form three columns. Accordingly, text block 903 is split into three text blocks based on column separators illustrated in FIG. 10A. The column address of each new text block is then addressed as column n, column n+1, and column n+2.

Similarly, as shown in FIG. 10B, text block 913 includes an incomplete line 911 which exists near column separator 912 as well. In this case, text block 913 is split into two text blocks using column separator 912. Each new text block is assigned a column address of column n and column n+1.

Once all text blocks with ranges have been divided into smaller text blocks, in step S619, text blocks which have the same column and row address are combined into one text block. This may occur when groups have been combined, as discussed previously, or if a gap does not meet the pre-defined criteria.

In step S620, column and row address coordinates of the table are stored in memory in order to update the hierarchical tree structure. Prior to updating the hierarchical tree structure for table 800, hierarchical tree structure 1100 has a page node, a table branching from the page node, and 15 text block nodes branching from the table node. Once table 800 undergoes processing according to the present invention, each table cell of text is sub-divided into columns and rows and, utilizing the stored address coordinates, the hierarchical tree structure of the document page can be updated as shown in FIG. 11B.

Figure 11A:
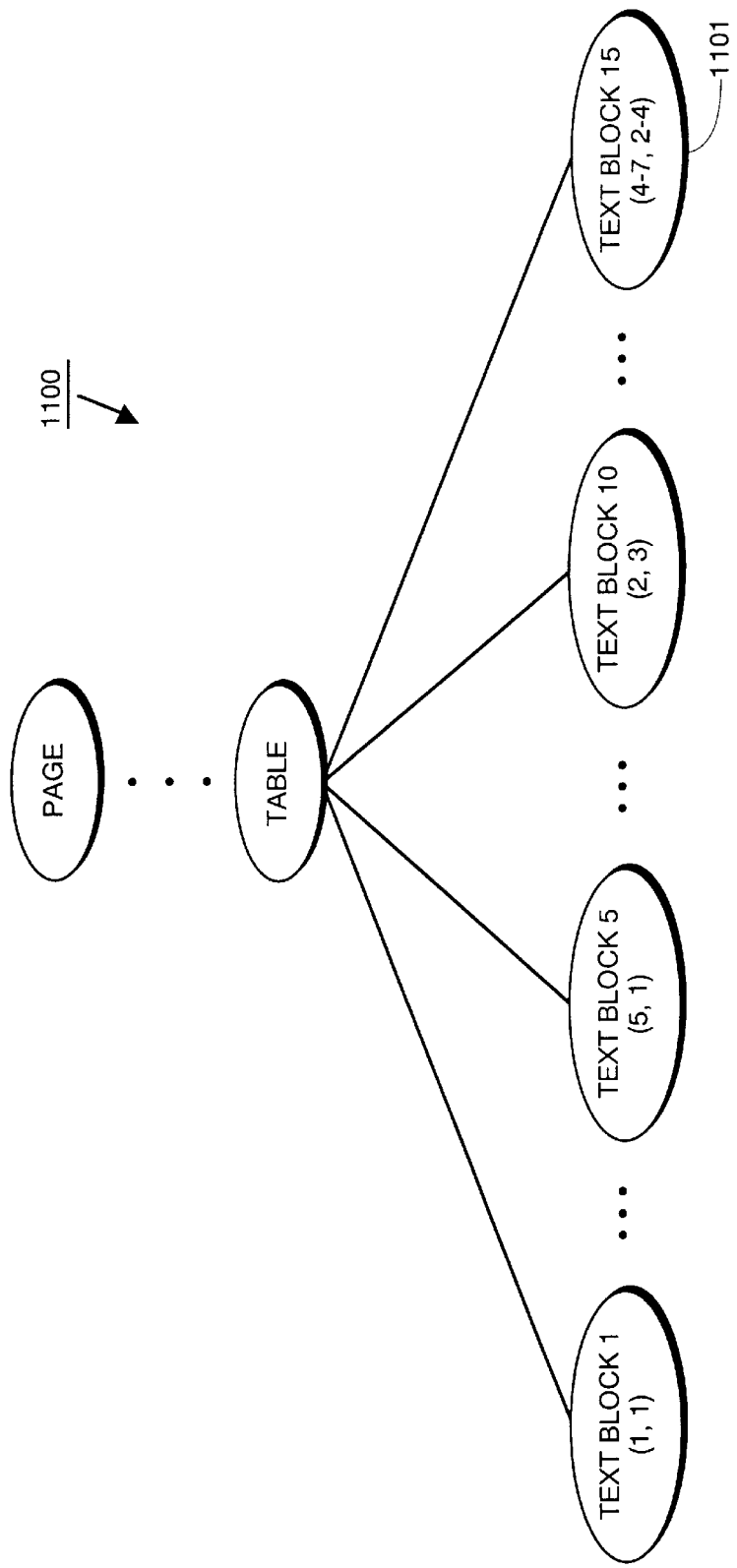
FIG. 11A is a representational view of a hierarchical tree structure resulting from block selection processing on the table shown in FIG. 9A
Figure 11B:
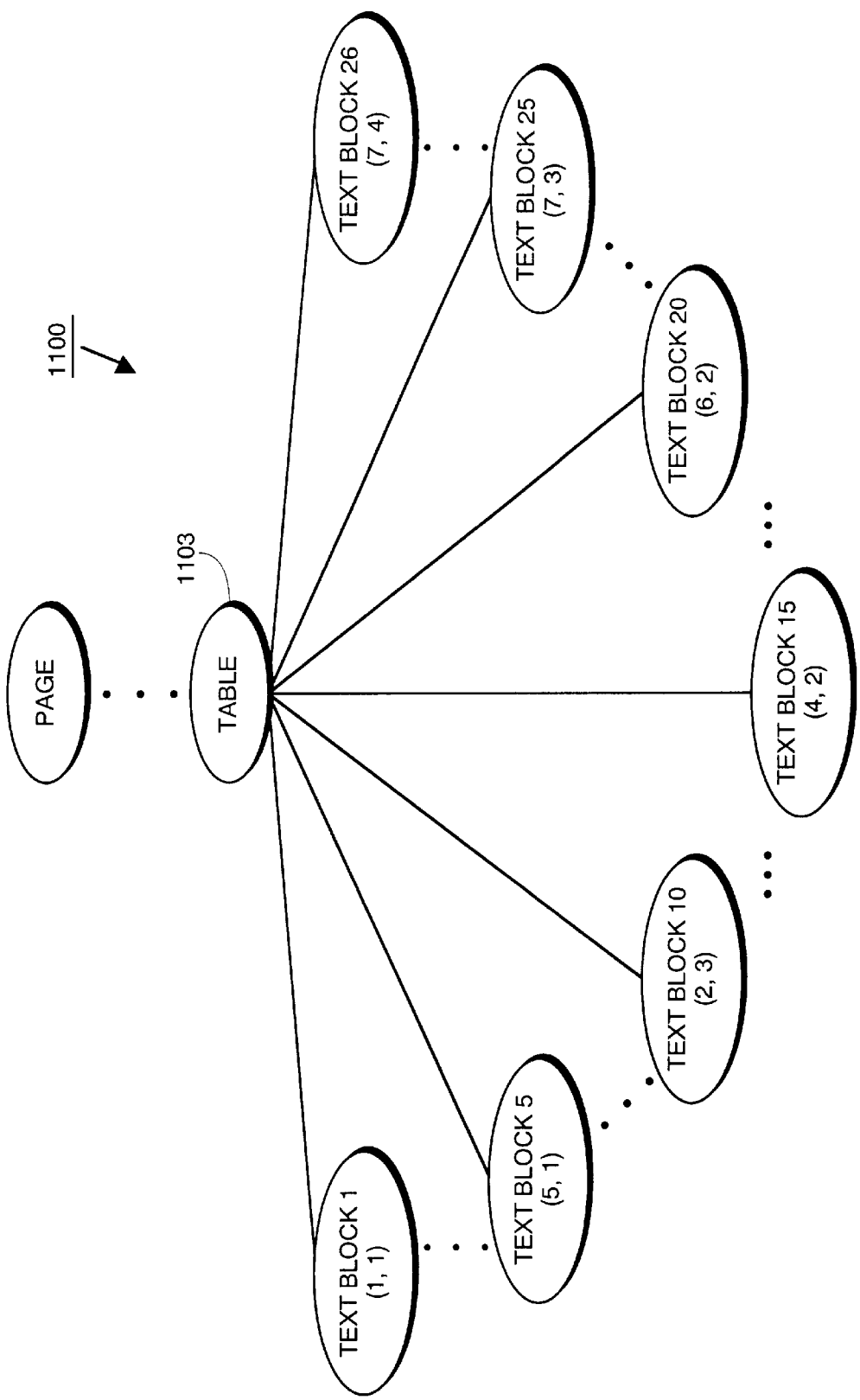
FIG. 11B is a representational view of the same hierarchical tree after it has been updated when the table in FIG. 9B has undergone column and row analysis.

FIG. 11B shows hierarchical tree structure 1100 after applying block selection processing of the present invention to table 800 shown in FIG. 9A. Hierarchical tree structure 1100 shows the hierarchy for table 800 shown in FIG. 9B. It is to be understood that any other type of image data located in a page would be shown as well but those nodes are not shown for the purposes of brevity and clarity. Thus, hierarchial tree structure 1100 shows table node 1101. Branching off table node 1103 are text blocks 1–26, of which only textblock1, textblock5, textblock10, textblock15, textblock20, textblock25 and textblock26 are shown.

As discussed above, textblock15 contained a plurality of individual cells of text which have now been sub-divided into smaller text blocks when submitted to column/row separation processing. The result of processing the text block results in smaller text blocks which are assigned individual address coordinates. This result is shown in FIG. 11B as 26 text blocks branching off table node 1103 in hierarchical tree structure 1100.

As can be readily understood, the result of processing a table using the present invention results in a logically defined hierarchical tree structure of a table which will be used for post-processing the table image data in the document page. For example, utilizing the column and row information of text blocks stored in hierarchical tree structure 1100, text data can be properly extracted based on specific column and row address coordinates. If some specified address coordinate is related to a text block with a single column and row address, then an internal image of the text block will be extracted. However, if some specified address of a text block includes either a column address range or row address range, then all of the cells of text within the text block is extracted. As shown in FIG. 9, if text block 803, which is the same as text blocks 804 or 805, is requested, the whole content of the text block is extracted. However, if cell 808 could not be further divided, then all cells of text inside block 808 are extracted. On the other hand, in the case of FIG. 9B, after performing step S618, text block 808 is sub-divided into 12 smaller text blocks and each are sequentially addressed as (4,2)–(4,4), (5,2)–(5,4), (6,2)–(6,4), and (7,2)–(7,4). In this regard, it is noted that since text block 802 does not include any gaps between text data, block 802 remains the same since no column or row separators could be inserted between the text data within the block.

The invention has been described with respect to a particular embodiment. It is to be understood that the present invention is not limited to the above description but may be applied to all types of image data and not just table image data. In addition, various changes and modifications may be made by those of ordinary skill in the art without departing from the spirit and scope of the invention.

What is claimed is:

1. In a feature extraction system for analyzing image data of an input document image, a method for identifying image data as a table image and for identifying text within the table image, the method comprising the steps of:

inputting image data of a document page;

performing block selection processing on the image data, said block selection processing identifying and separating the image data into blocks having the same image type;

identifying table image data based on the separated blocks of image data;

identifying text blocks within the table image data;

horizontally sorting each text block located in the table image data in relation to each other text block located in the table image data based on horizontal position information;

vertically sorting each text block located in the table image data in relation to each other text block located in the table image data based on vertical position information;

calculating rows and columns based on a result of the vertical and the horizontal sorting steps;

assigning a column address and a row address to each text block in the table image data based on the calculating step; and storing the assigned addresses of each text block.

2. A method according to claim 1, further comprising analyzing all text blocks having a column or row address range in the table image data in order to determine if the text block can be further separated, wherein each text block having either a column or row address range is analyzed to determine if a text block having either column or row address range can be further divided into at least one additional text block, and, if it is determined that a text block can be further divided, dividing the text block.

3. A method according to claim 2, further comprising assigning a new text block address to divided text blocks.

4. A method according to claim 3, further comprising storing the new text block address for each text block which was assigned an address.

5. In a feature extraction system which creates a hierarchical tree structure corresponding to a block template of a document page, wherein the hierarchical tree structure includes a plurality of nodes each of which represents a block of image data in the block template of a document page and contains address data defining locations of the image data in the document page, a method of identifying table image data and locating text image data within the table, comprising the steps of:

inputting image data of a document page;

performing block selection processing so as to identify and separate the image data into blocks having the same image type;

identifying blocks of image data which contain table image data;

locating text blocks within the table image data;

horizontally sorting each text block located in the table image data in relation to each other text block located in the table image data based on horizontal position information;

vertically sorting each text block located in the table image data in relation to each other text block located in the table image data based on vertical position information;

calculating rows and columns based on a result of the vertical and the horizontal sorting steps;

assigning column and row address information to each text block in the table image data based on the calculating step; and storing, in a node representing the block of table image data in the hierarchical tree, table address information and storing, in respective nodes representing text blocks branching from the node representing the table image data, text block address information.

6. A method according to claim 5, further comprising analyzing all text blocks having a column or row address range in the table image data, wherein each text block having either a column or row address range is analyzed to determine if a text block having either column or row address range can be further divided into at least one additional text block, and, if it is determined that a text block can be further divided, dividing the text block.

7. A method according to claim 6, further comprising assigning a new text block address to new divided text blocks.

8. A method according to claim 6, further comprising storing, in a node branching from a text block from which a new text block was divided out, address information for the new text block.

9. In a feature extraction system for analyzing image data of an input document image, an apparatus for identifying image data as a table image and for identifying text data within the table image, comprising:

input means for inputting image data of a document page;

block selection processing means for performing block selection processing on the image data, said block selection processing means identifying and separating the image data into blocks having the same image type;

identifying means for identifying table image data based on the separated blocks of image data;

identifying means for identifying text blocks within the table image data;

horizontal sorting means for sorting of each text block located in the table image data in relation to each other text block located in the table image data based on horizontal position information;

vertical sorting means for sorting of each text block located in the table image data in relation to each other text block located in the table image data based on vertical position information;

calculating means for calculating rows and columns based on a result of the vertical and the horizontal sorting;

address assigning means for assigning column and row address information to each text block in the table image data; and storing means for storing the assigned address information of each text block.

10. An apparatus according to claim 9, wherein the sorting means analyzes all text blocks having a column or row address range in the table image data in order to determine if the text block having either a column or row address range can be further divided into at least one additional text block, and, if so, dividing the text block into at least two new text blocks.

11. An apparatus according to claim 10, wherein the address assigning means assigns a new text block address in the case a text block having either a column or row address range is further divided into at least two new text blocks.

12. An apparatus according to claim 10, wherein the storing means stores the text block address for each text block which was divided by the sorting means.

13. For a feature extraction system for analyzing image data of an input document image, a computer-readable memory medium storing computer-executable process steps to identify image data as a table image and to identify text within the table image, the steps comprising:

an inputting step to input image data of a document page;

a performing step to perform block selection processing on the image data, said block selection processing identifying and separating the image data into blocks having the same image type;

an identifying step to identify table image data based on the separated blocks of image data;

an identifying step to identifying text blocks within the table image data;

a horizontally-sorting step to horizontally sort each text block located in the table image data in relation to each other text block located in the table image data based on horizontal position information;

a vertically-sorting step to vertically sort each text block located in the table image data in relation to each other text block located in the table image data based on vertical position information;

a calculating step to calculate rows and columns based on a result of the vertically and the horizontally-sorting steps;

an assigning step to assign a column address and a row address to each text block in the table image data based on the calculating step; and a storing step to store the assigned addresses of each text block.

14. For a feature extraction system which creates a hierarchical tree structure corresponding to a block template of a document page, wherein the hierarchical tree structure includes a plurality of nodes each of which represents a block of image data in the block template of a document page and contains address data defining locations of the image data in the document page, a computer-readable memory medium storing computer-executable process steps to identify table image data and to locate text image data within the table, the steps comprising:

an inputting step to input image data of a document page;

a performing step to perform block selection processing so as to identify and separate the image data into blocks having the same image type;

an identifying step to identify blocks of image data which contain table image data;

a locating step to locate text blocks within the table image data;

a horizontally-sorting step to horizontally sort each text block located in the table image data in relation to each other text block located in the table image data based on horizontal position information;

a vertically-sorting step to vertically sort each text block located in the table image data in relation to each other text block located in the table image data based on vertical position information;

a calculating step to calculate rows and columns based on a result of the vertical and the horizontal sorting steps;

an assigning step to assign column and row address information to each text block in the table image data based on the calculating step; and a storing step to store, in a node representing the block of table image data in the hierarchical tree, table address information, and to store, in respective nodes representing text blocks branching from the node representing the table image data, text block address information.

15. A method according to claim 1, wherein said calculating step further comprises:

calculating columns based on a result of said horizontal sorting step; and calculating rows based on a result of said vertical sorting step.

16. A method according to claim 5, wherein said calculating step comprises:

calculating columns based on a result of said horizontal sorting step; and calculating rows based on a result of said vertical sorting step.

17. An apparatus according to claim 9, wherein said calculating means comprises:

calculating means for calculating columns based on a result of the horizontal sorting; and calculating rows based on a result of the vertical sorting.

18. A computer-readable memory medium according to claims 13, wherein said calculating step comprises:

a calculating step to calculate columns based on a result of said horizontally-sorting step; and a calculating step to calculate rows based on a result of said vertically-sorting step.

19. A computer-readable medium according to claim 14, wherein the calculating step comprises:

a calculating step to calculate columns based on a result of said horizontal sorting step; and a calculating step to calculate rows based on a result of said vertical sorting step.

* * * * *